United States Patent [19]

Uchida et al.

[11] Patent Number: 5,214,769
[45] Date of Patent: May 25, 1993

[54] MULTIPROCESSOR CONTROL SYSTEM

[75] Inventors: Nobuo Uchida, Tokyo; Yasuhiro Kuroda; Shoji Nakatani, both of Kawasaki, all of Japan

[73] Assignee: Fujitsu Limited, Kawasaki, Japan

[21] Appl. No.: 760,821

[22] Filed: Sep. 17, 1991

Related U.S. Application Data

[63] Continuation of Ser. No. 286,858, Dec. 20, 1988, abandoned.

[30] Foreign Application Priority Data

Dec. 24, 1987 [JP] Japan .................. 62-328259

[51] Int. Cl.$^5$ ............................. G06F 12/00
[52] U.S. Cl. .................. 395/425; 364/931.46; 364/DIG. 2; 364/238.4; 364/DIG. 1
[58] Field of Search ........... 395/425, 931.46, 325, 395/725; 364/DIG. 2; 379/94

[56] References Cited

U.S. PATENT DOCUMENTS

| | | | |
|---|---|---|---|
| 3,665,487 | 5/1972 | Campbell et al. | 364/200 |
| 4,130,864 | 12/1978 | Schlotterer | 364/200 |
| 4,342,079 | 7/1982 | Stewart et al. | 364/200 |
| 4,394,731 | 7/1983 | Flusche et al. | 364/200 |
| 4,611,276 | 9/1986 | Vinot | 364/200 |
| 4,654,778 | 3/1987 | Chiesa et al. | 364/200 |
| 4,674,032 | 6/1987 | Michaelson | 364/200 |
| 4,685,076 | 8/1987 | Yoshida | 364/736 |
| 4,718,006 | 1/1988 | Nishida | 364/200 |
| 4,875,155 | 10/1989 | Iskiyan et al. | 364/200 |

FOREIGN PATENT DOCUMENTS 0309330 3/1989 European Pat. Off.

OTHER PUBLICATIONS

IBM Technical Disclosure Bulletin, vol. 25, No. 1, Jun. 1982, "Solution for Shared/Private Memory in Multisystem Configuration", K. G. Tan, pp. 194-198.
Patent Abstracts of Japan, vol. 6, No. 206 (P-149) (1084), Oct. 19, 1982; & JP-A-57 113 166 (Fujitsu K.K) Jul. 14, 1982 *abstract*.
Patent Abstracts of Japan, vol. 11, No. 97 (P-560), Mar. 26, 1987; & JP-A-61 248 153 (Fujitsu Ltd.) Nov. 5, 1986 *abstract*.

*Primary Examiner*—Michael R. Fleming
*Assistant Examiner*—Glenn A. Auve
*Attorney, Agent, or Firm*—Staas & Halsey

[57] ABSTRACT

A multiprocessor control system which has at least one main storage unit, a plurality of main storage control units, a plurality of processing units, and a control bus. Each processing unit is connected to the main storage unit through one of the main storage control units. When each processing unit transmits a request for access to at least one main storage unit, the processing units transmit the request to the main storage control units to which each processing unit is connected, and simultaneously, to all of the other main storage control units, through the control bus. All of the main storage control units process the request from the processing unit, synchronously, and execute a busy check control or the like. Data transmitted between each processing unit and an arbitrary one of the main storage units is transmitted only through the main storage control unit to which the processing unit is connected. By using this system, if units needing a high throughput are applied, the system can be controlled in a comparatively simple manner.

28 Claims, 7 Drawing Sheets

Fig. 1

PRIOR ART

REQUEST FORMAT

MULTIPROCESSOR CONTROL SYSTEM

This application is a continuation of application Ser. No. 07/286,858, filed Dec. 20, 1988, now abandoned.

BACKGROUND OF THE INVENTION

1. Field of the Invention

The present invention relates to a multiprocessor control system wherein a request for access to a main storage unit is always transmitted among all main storage control units. The access request control for a main storage unit is operated synchronously for each of the main storage control units.

2. Description of the Related Art

There is an increasing need for computers having more functions and higher speeds. For example, even in a vector processing unit, which calculates matrices, a multiprocessor system is usually used, and when a plurality of vector processing units or the like are operated simultaneously with a common main storage unit, the system must have a sufficient throughput. In a multiprocessor system, usually a plurality of main storage units and a plurality of information processing units, i.e., processing elements, are connected to the main storage control units, and a plurality of information processing units have access to a plurality of main storage units.

When a system having one main storage control unit is expanded to become a multiprocessor system having a plurality of main storage control units, one main storage control unit controls only predetermined main storage units and the other main storage control units control all of the other main storage units except for the above predetermined main storage units.

When a processing unit requires access to a main storage unit, first the processing unit transmits a request to a main storage control unit to which the processing unit is connected, through a bus, and then the main storage control unit receiving the request determines whether the request is for a main storage unit which it controls, or for the other main storage control units which it does not control. If the main storage unit is one which is controlled by the main storage control unit, the main storage control unit accesses that main storage unit. But, if the main storage unit is controlled by another main storage control unit, the main storage control unit transmits the request to the other main storage control unit, and the other main storage control unit carries out the access processing.

Predetermined main storage units are connected to a main storage control unit, and thus each main storage control unit independently has access to main storage units which it controls (hereinafter, local units). When access to main storage units not controlled by the main storage control (hereinafter, remote units) is required, another main storage control unit connected to the main storage units carries out the access processing.

The above-mentioned system can be used in many cases if a processing unit processes one piece of data per one instruction, as in a general computer. But, if a processing unit processes many pieces of data per one instruction, as in a vector processing unit, is applied to the system, a request priority acquisition state becomes unbalanced, since the system must maintain the order of data within that one instruction. Accordingly, a main storage control unit must be provided with a table for managing a state of another main storage control unit, and a problem arises in that a delayed control of the signals becomes difficult.

In a general purpose computer, for example, an address allocation for a main storage unit is executed in a 4k byte group using a page interleave. In a vector processing unit, however, a high throughput of 4×8 bytes during each cycle is required, and thus an 8 bytes interleave is applied. In addition, since 4 elements of data are processed during each cycle, a simultaneous data transmission and reception from the main storage unit becomes necessary. In this case, during a data fetch, the vector processing unit must fetch 4×8 bytes of data in parallel to a vector register therein from main storage units. Therefore, a reduction of the difference in the data transmission time becomes necessary. Further, priority acquisition signals must be transmitted between the main storage control units, and remote priority acquisition information must be controlled by providing tables or the like. Accordingly, control becomes extremely complicated and the performance level is lowered.

The present invention is intended to solve the above problems.

Note: As a publication relating to this invention, please refer to U.S. Pat. No. 4,718,006.

SUMMARY OF THE INVENTION

An object of the present invention is to provide a multiprocessor control system wherein the control of main storage units is synchronously carried out among a plurality of main storage control units, and high throughput processor units having access to the main storage units are incorporated, to provide a multiprocessor system.

According to the present invention, there is provided a multiprocessor control system comprising at least one main storage unit, a plurality of main storage control units each having a priority order determination circuit, a plurality of processing units, and a control bus. Each processing unit is connected to at least one main storage unit through one of the main storage control units. When one of the processing units transmits a request for access to one of the main storage units, the processing unit transmits the request to the main storage control unit connected thereto but simultaneously transmits the request to all the other main storage control units, through the control bus. Further, the main storage control unit connected to the processing unit receives requests from all processing units connected to the other main storage control units. All the priority order determination circuits operate synchronously when receiving a request from one of the processing units and control the necessary busy checks. Data is transmitted between one of processing units and an arbitrary main storage unit through only the main storage control unit to which the processing unit is connected.

DESCRIPTION OF THE PREFERRED EMBODIMENTS

Prior to the explanation of the preferred embodiments, a known multiprocessor control system is explained with reference to FIG. 1.

Figure 1:
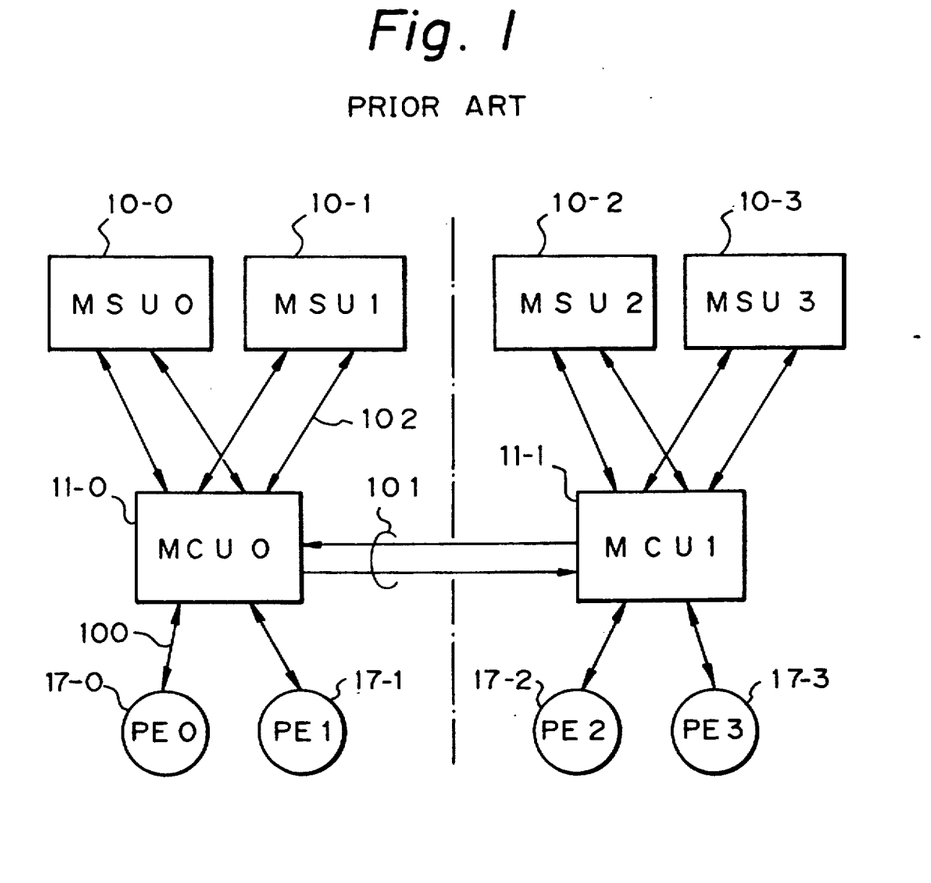
FIG. 1 is a block circuit diagram of a general multiprocessor control system.

In FIG. 1, reference numerals 10-0 to 10-3 denote main storage units (MSU), 11-0 and 11-1 denote main storage control units (MCU), 17-0 to 17-3 denote processing units (PE), 100 denotes request and data buses between the PEs and MCUs, 101 denotes a request information transmission bus between the MCUs, and 102 denotes request and data buses between the MSUs and the MCUs.

The MCU 11-0 controls only the MSUs 10-0 and 10-1 and the MCU 11-1 controls only the MSUs 10-2 and 10-3.

When one of the PEs accesses an MSU, the PE transmits a request to the MCU to which the PE is connected through the bus 100. Upon receiving the request, the MCU determines whether the request is for a local MSU (if the main storage control unit is MCU0, the local main storage units are MSU0 and MSU1) or for a remote MSU (if the main storage control unit is MCU0, the remote main storage units are MSU2 and MSU3). If the request is for a local MSU, the MCU accesses that local MSU. If the request is for a remote MSU, the MCU transmits the request to another MCU through the bus 101, and the remote MCU accesses the required remote MSU.

Namely, each MCU has independent access to local MSUs. When access is required to a remote MSU, each MSU transfers the process to another MCU.

Figure 2:
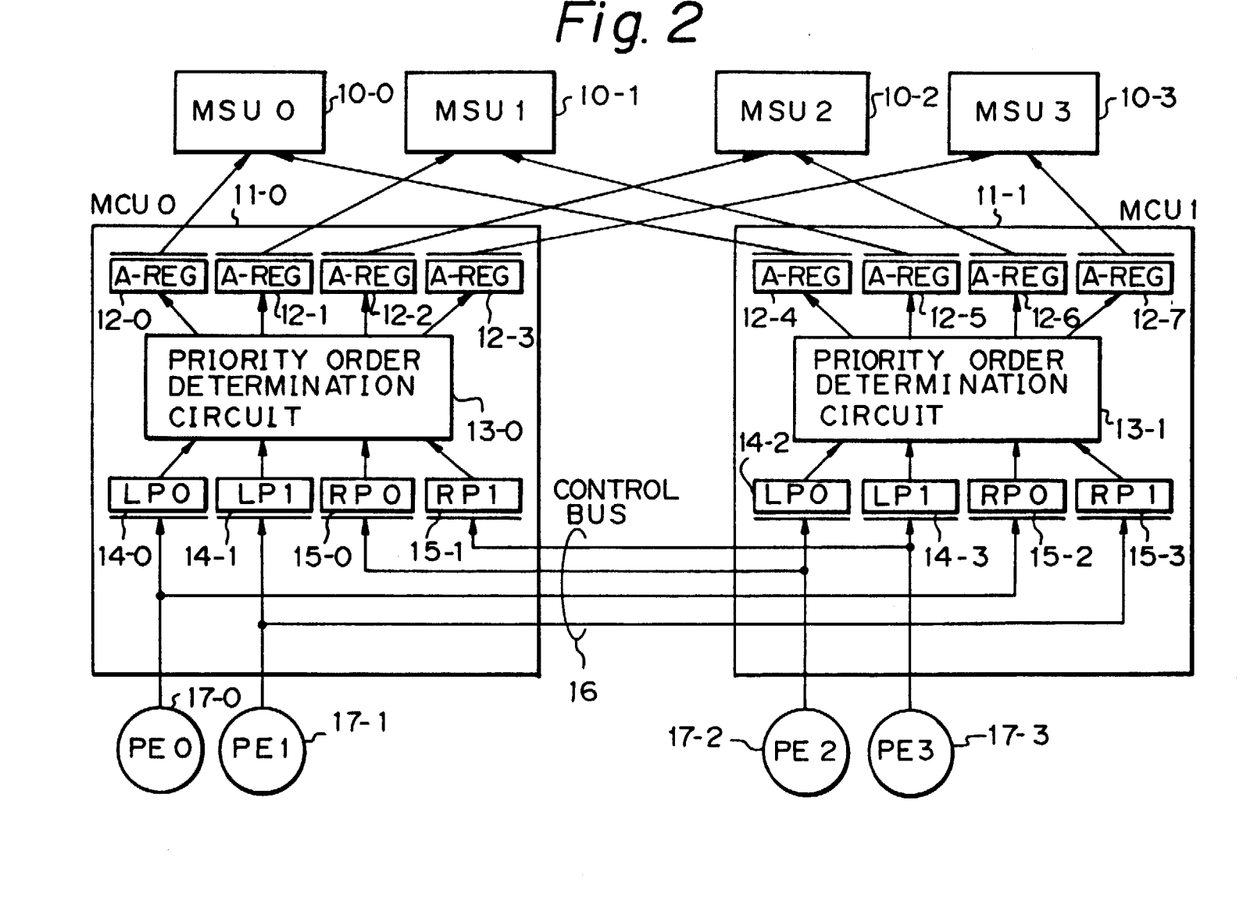
FIG. 2 is a block circuit diagram of an embodiment according to the present invention.
Figure 3:
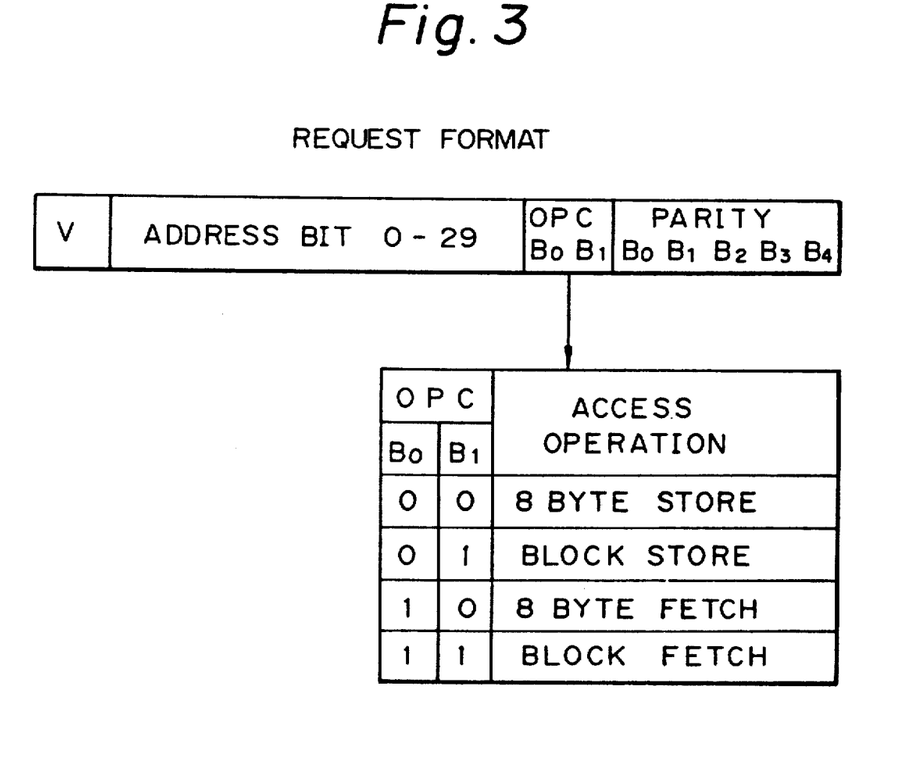
FIG. 3 is a diagram of a format of a request in the embodiment of FIG. 2.
Figure 4:
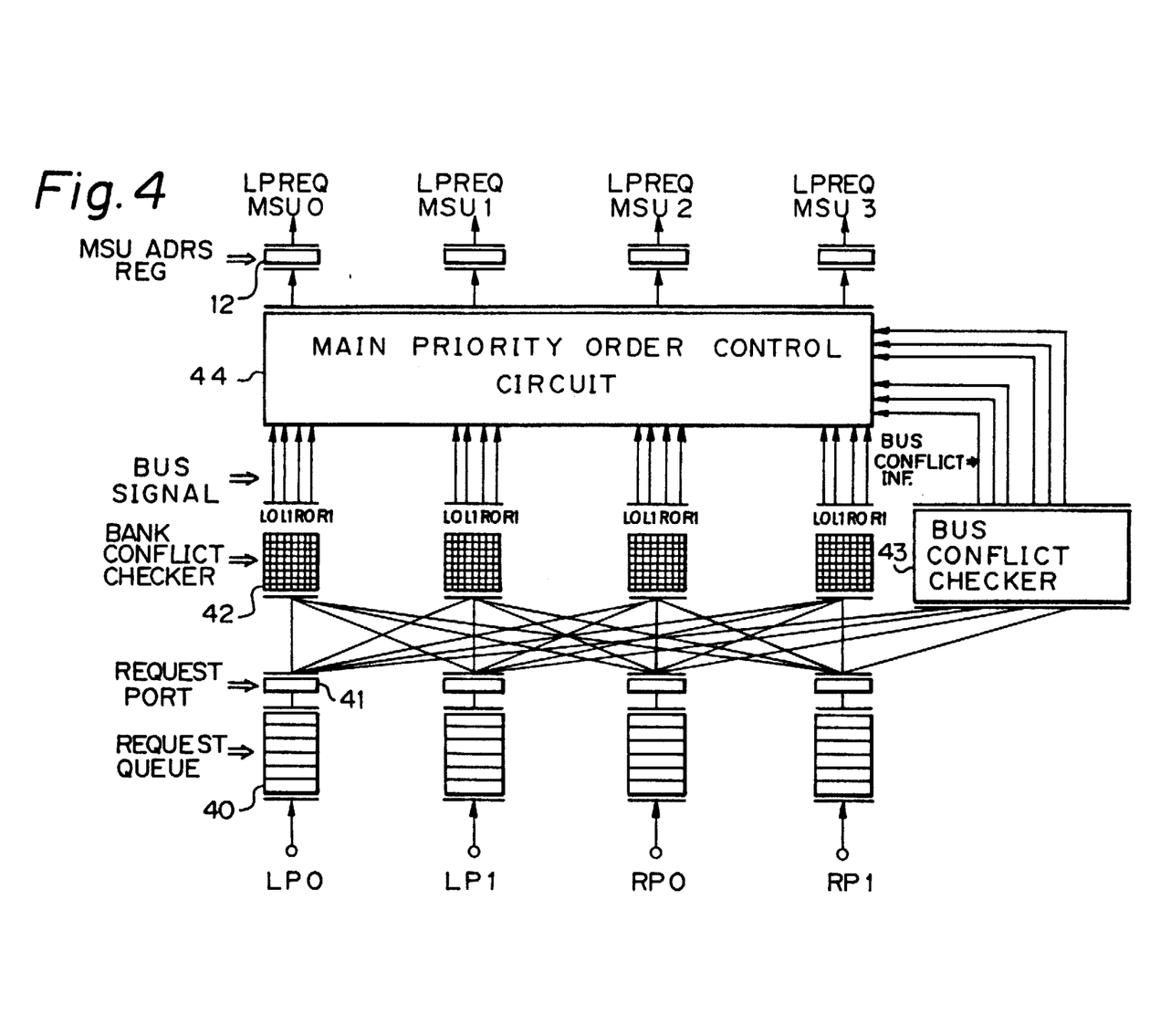
FIG. 4 is a circuit diagram of an example of a priority order determination circuit in FIG. 2.
Figures 5, 5A:
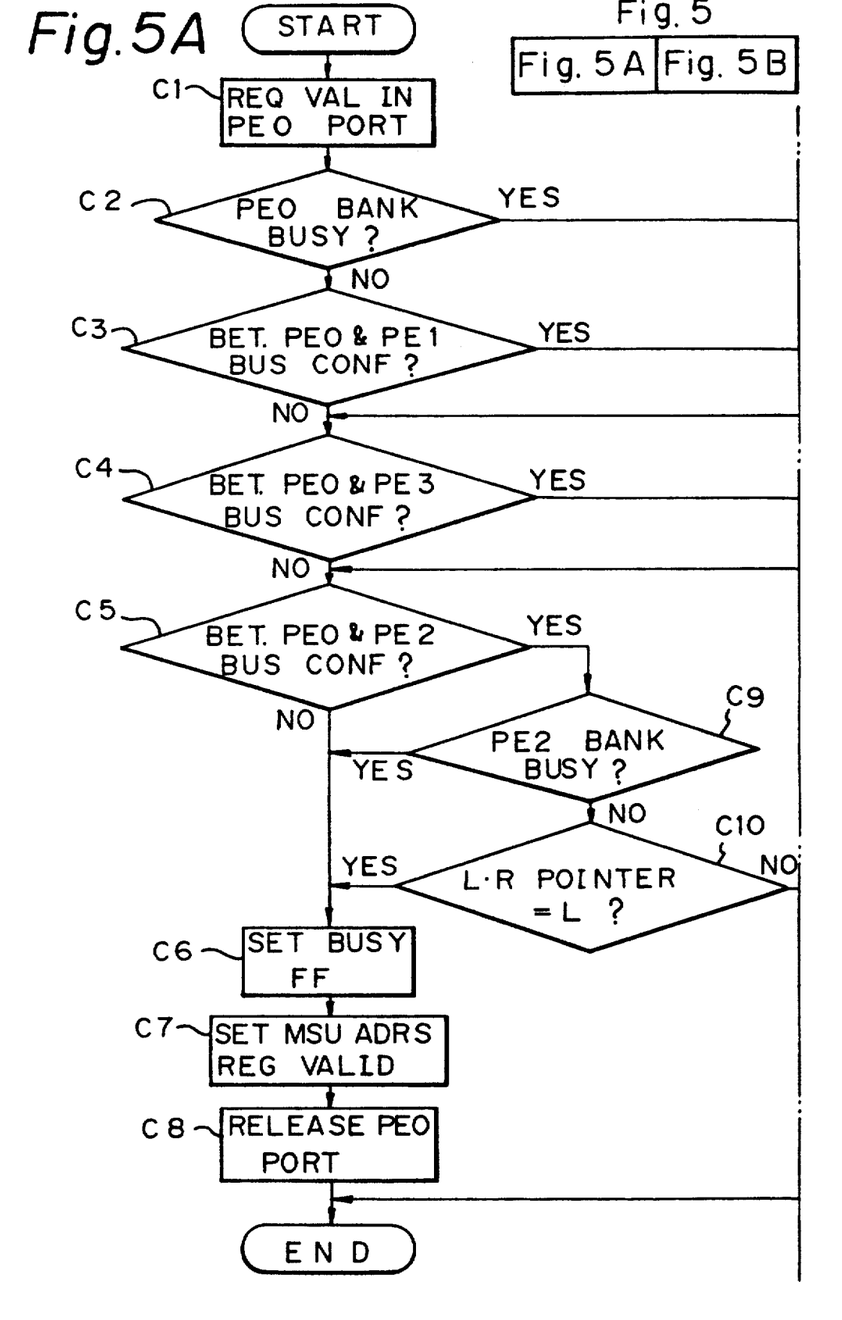
FIGS. 5A and 5B are a flowchart of the control carried out by a main priority order control circuit shown in FIG. 4.
Figure 5B:
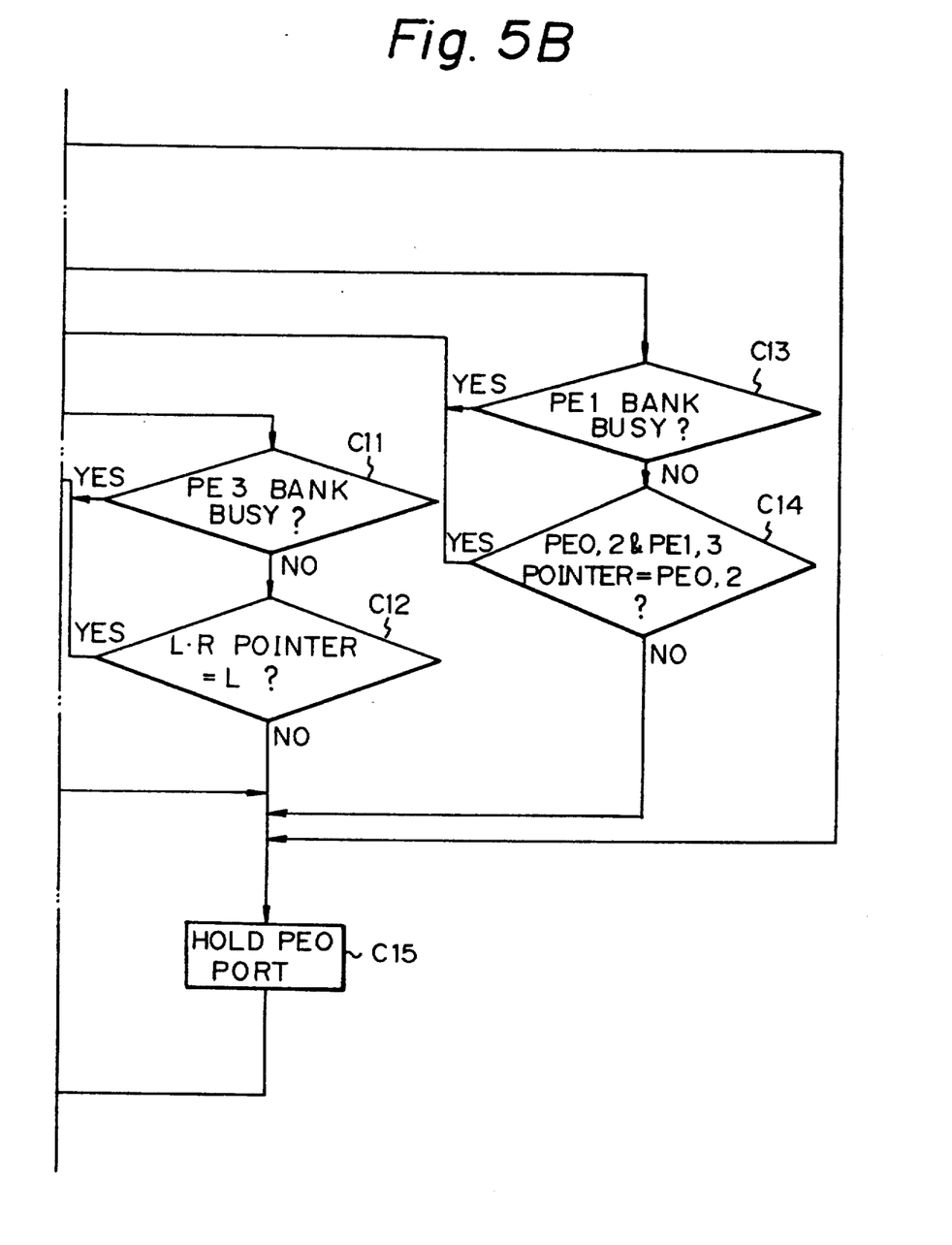

The preferred embodiments of the present invention are explained as follows, with reference to the accompanying drawings. FIG. 2 is a block circuit diagram of an embodiment of the present invention. FIG. 3 is an example of a format of a request in the embodiment of FIG. 2. FIG. 4 is a block circuit diagram of a priority order determination circuit in the embodiment of FIG. 2. FIGS. 5A and 5B taken together are a flowchart explaining the control of a main priority order control circuit in FIG. 4.

The system shown in FIG. 2 comprises main storage units (MSU0, MSU1, MSU2, and MSU3) 10-0, 10-1, 10-2, and 10-3; main storage control units (MCU0 and MCU1) 11-0 and 11-1 which control the main storage units (MSUs); processing units or elements (PE0, PE1, PE2, and PE3) 17-0, 17-1, 17-2, and 17-3 wherein data is processed; and a control bus 16 through which requests are transmitted between the main storage control units (MCUs).

The MCU 11-0 comprises address registers (A-REG) 12-0, 12-1, 12-2, and 12-3, in which request information including address information for each MSU is set, and a priority order determination circuit 13-0 wherein bank busy checks and bus conflict checks or the like are executed, and which determines the access priority order to the MSU. In addition, the MCU 11-0 includes local request ports (LP0, LP1) 14-0 and 14-1 which receive requests from the PEs 17-0 and 17-1 belonging to the same MCU, and remote request ports (RP0, RP1) 15-0 and 15-1 which receive requests from the PEs 17-2 and 17-3 belonging to the other MCU 11-1.

The MCU 11-1 similarly comprises address registers (A-REG) 12-4, 12-5, 12-6, and 12-7; a priority order determination circuit 13-1; local request ports (LP0, LP1) 14-2 and 14-3; and remote request ports (RP0, RP1) 15-2 and 15-3, and the operation thereof is the same as that of the corresponding elements of the MCU 11-0.

The address registers 12-0, 12-1, 12-2, and 12-3 are connected to the MSUs 10-0, 10-1, 10-2, and 10-3, and to the priority order determination circuit 13-0. The local request ports 14-0 and 14-1 and the remote request ports 15-0 and 15-1 are connected to the priority order determination circuit 13-0. The PE 17-0 is connected to the local request port 14-0 and the remote request port 15-2. The PE 17-1 is connected to the local request port 14-1 and the remote request port 15-3.

The address registers 12-4, 12-5, 12-6, and 12-7 are connected to the MSUs 10-0, 10-1, 10-2, and 10-3, and to the priority order determination circuit 13-1. The local request ports 14-2 and 14-3 and the remote request ports 15-2 and 15-3 are connected to the priority order determination circuit 13-1. The PE 17-2 is connected to the local request port 14-2 and the remote request port 15-0. The PE 17-3 is connected to the local request port 14-3 and the remote request port 15-1.

The connections between PE0 (17-0) and RP0 (15-2), between PE1 (17-1) and RP1 (15-3), between PE2 (17-2) and RP0 (15-0), and between PE3 (17-3) and RP1 (15-1) are made through the control bus 16.

When a request is sent from a PE for access to an MSU, the request information is always transmitted between the MCUs 11-0 and 11-1 through the control bus 16. For example, PE 17-0 supplies an access request to an MSU, and the request is set in the LP0 (14-0) and in the RP0 (15-2) through the control bus 16. The RP0 (15-2) in the MCU 11-1 corresponds to the LP0 (14-0) in the MCU 11-0. In addition, the local request ports 14-0 to 14-3 and the remote request ports 15-0 to 15-3 are arranged symmetrically with respect to the MCUs 11-0 and 11-1, as shown in FIG. 2.

Accordingly, the priority order determination circuits 13-0 and 13-1 operate synchronously, and thus the two circuits carry out bank busy controls or the like, in exactly the same way.

The MCUs 11-0 and 11-1 are connected to the MCUs 10-0 to 10-3 by a request bus and a data bus. Each MCU deals only with requests from the PEs which it controls when handling a request transmission to the MSU and the connection of the data bus.

An example of the format of a request set in the LPs 14-0 to 14-3 and RPs 15-0 to 15-3 is shown in FIG. 3.

The first bit V is a valid bit showing a validity of the request, and the following address bits 0 to 29 designate an address of the MSU, i.e., the address of stored data to be accessed. The busy control utilizes the lower 9 bits in the MCUs 11-0 and 11-1.

The OPC (operation code) bits B0 and B1 designate the kind of MSU access operation, wherein "0" denotes an 8 byte store, "01" denotes a block store, "10" denotes an 8 bytes, fetch, and "11" denotes a block fetch.

The PTY (parity) bits $B_0$, $B_1$, $B_2$, $B_3$, and $B_4$ denote parity bits for portions of the address bit and the OPC.

FIG. 4 is a circuit diagram of the priority order determination circuit shown in FIG. 2.

This priority order determination circuit comprises request queues 40, request ports 41, bank conflict checkers 42, a bus conflict checker 43, a main priority order control circuit 44, and MSU address registers 12.

The four request queues 40 receive request inputs LP0, LP1, RP0, and RP1 from the processing units PE0 to PE3. The request queues 40 comprise first-in-first-out (FIFO) type register groups, and the requests set in each FIFO are supplied to the request ports 41. The outputs from each request port 41 are transmitted to the bank conflict checkers 42 and a bus conflict checker 43. The bank is a unit of division in the MSU. The bank conflict checkers 42 check the bank busy states, and the bus conflict checker 43 checks the bus conflict state. Each bank conflict checker 42 is provided with a busy flag in each memory bank, to designate a busy or not busy state.

Each bank conflict checker 42 and the bus conflict checker 43 process the requests from the local PEs in the same way as the requests from the remote PEs.

The main priority order control circuit 44 controls access requests output to the MSU, based on the check result signals received from the bank conflict checker 42 and the bus conflict checker 43. Note, the request actually picked up in the main priority order control circuit 44 and output therefrom to the MSU address registers is that from a local PE0 or PE1, and the requests from the remote PEs are picked up but not output to the MSU address registers 12. When the check results from the bank conflict checker 42 and the bus conflict checker 43 show that access to the MSU is possible, a valid bit of the corresponding address register 12 in the MSUs 10-0 to 10-3 is turned "ON" and the access request is transmitted to the MSU.

FIGS. 5A and 5B are a flowchart of the control carried out by the main priority order control circuit 44 in FIG. 4.

First, control of the request from the local PE0 will be explained. Note the control of other requests is the same except that the requests for access to the MSUs are output or not output in accordance with whether they are local or remote.

Control 1 (C1)

When the valid bit of the request is turned "ON" in the request port 41 corresponding to the local PE0, the bank busy and bus conflict checks are started.

Control 2 (C2)

If the bank to be accessed from the PE0 is busy, the request port of the PE0 is held in a waiting state by the control 15 (C15) until the bank is not busy.

Control 3 (C3)

When the bank to be accessed from the PE0 is not busy, it is determined whether or not a bus conflict exists between the local PE0 and PE1. If a conflict exists, the procedure goes to C13 and a bank busy check is carried out for the PE1.

Control 4 (C4)

Next, it is determined whether or not a bus conflict exists between the local PE0 and the remote PE3. If a conflict exists, the procedure goes to C11 and a bank busy check is carried out for the PE3.

Control 5 (C5)

Here, it is determined whether or not a bus conflict exists between the local PE0 and the remote PE2. If a conflict exists, the procedure goes to C9 and a bank busy check is carried out for the PE2.

Control 6 (C6)

If the request passes the bank busy check and the bus conflict check, the corresponding flip-flop (FF) indicating the busy state is set. The flip-flop is located in the bank conflict checker 42.

Control 7 (C7)

The valid bit is turned "ON" in the address register 12 of the MSU to be accessed.

Control 8 (C8)

Simultaneously, the valid bit of the request port of the PE0 currently turned "ON" is turned "OFF", and the request is released. The request port then waits for the next request.

Control 9 (C9)

If a bank conflict exists between the remote PE2 and the local PE0, then it is determined whether or not the bank to be accessed from the PE2 is busy. If the result is positive the access request can be output, and thus the control 6 and the follow controls are executed.

Control 10 (C10)

If the bank to be accessed from the PE2 is not busy, because the local and remote requests have been made simultaneously, only one of the requests can be given access, and the selection is made in this example by a pointer which points to the local side or the remote side, alternately. When the pointer is at the local side, the access request from the local side is executed, and when the pointer is at the remote side, the request is held by the control C15.

Controls 11 and 12 (C11, C12)

With respect to controls 9 and 10, it is determined whether or not access can be allowed in accordance with the busy or not busy state of the bank to be accessed from the remote PE3.

Controls 13 and 14 (C13, C14)

With respect to controls 9 and 10, it is determined whether or not access can be allowed in accordance with the busy or not busy state of the bank to be accessed from the local PE0. Here, when the bank to be accessed from the local PE1 is not busy, the priority between the PE0 and PE1 is determined by whether the pointer is on the PE0 side or on, the PE1 side. Note, the priority may be determined in other ways.

Control 15 (C15)

When access cannot be given the request port concerned is held in a waiting state.

The above-description is of an example of the control according to this invention, and the sequence of the control timing or the like may be changed if desired.

Figure 6:
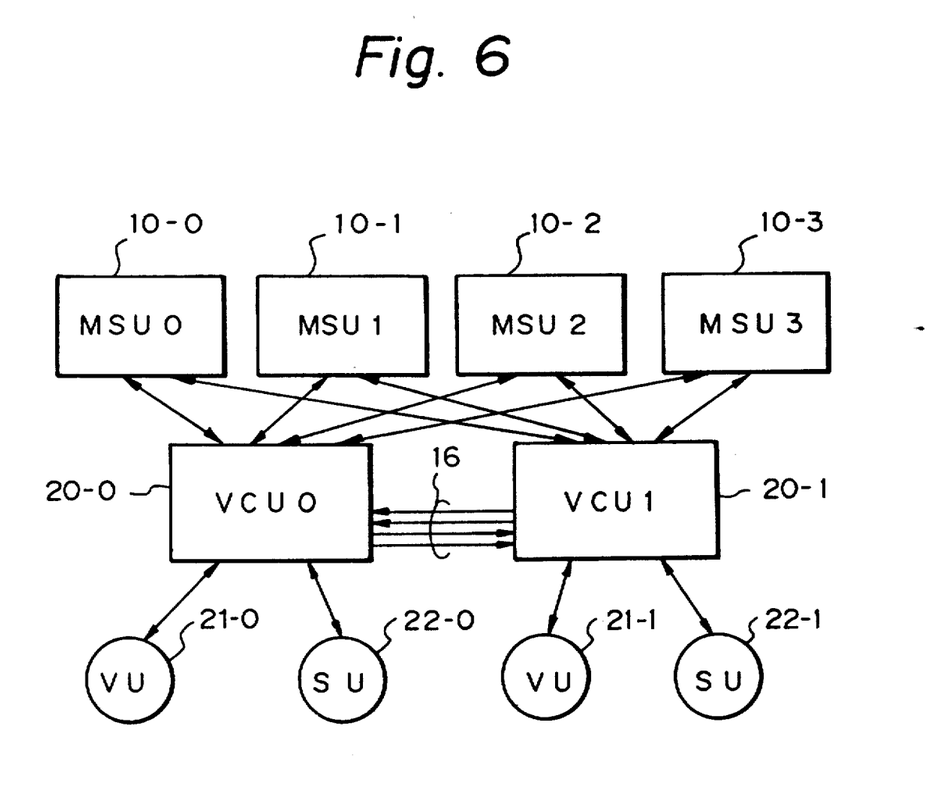
FIG. 6 is a block circuit diagram of the embodiment of FIG. 2.

FIG. 6 shows a more concrete example of the processing units and main storage control units. As shown in FIG. 6, the local processing units PE0 and PE1 and remote processing units PE2 and PE3 are replaced by a local vector processing unit (VU) 21-0, a local scalar processing unit (SU) 22-0, a remote vector processing unit (VU) 21-1, and a remote scalar processing unit (SU) 22-1, respectively. Further, the main storage control units MCU0 and MCU1 are replaced by vector control units VCU0 (20-0) and VCU1 (20-1), respectively.

Accordingly, in the bank conflict checker, L0 is replaced by LV (local vector), L1 by LS (local scalar), R0 by RV (remote vector), and R1 by RS (remote scalar). Further, as the inputs shown in FIG. 4, LP0 is replaced by a LOCAL VU, LP1 is replaced by a LOCAL SU, RP0 is replaced by a REMOTE VU, and RP1 is replaced by a REMOTE SU.

Accordingly, in the flowchart of FIGS. 5A and 5B, PE0, is replaced by LVU, PE1 is replaced by LSU, PE2 is replaced by RVU, and PE3 is replaced by RSU. The PE0 and PE2 sides becomes the V side and the PE1 and PE3 sides becomes the S side, and therefore, the PE0, 2 and PE1, 3 POINTER is replaced by a V.S pointer.

In this embodiment, all requests are transmitted to all of the main storage control units through the control bus 16, and all the main storage control units control the bank busy check and the bus conflict check in exactly the same way. Therefore, each main storage control unit can independently process the request execution for a processing unit of a main storage control unit which it controls. Further, the busy state is indicated simultaneously in all main storage control units. The accessed data is transmitted to the processing unit directly through the main storage control unit which the MCU controls, and as a result, the control is greatly simplified. The plurality of main storage control units have the same construction and each unit can be constructed by the same hardware.

In the above embodiment, an example of two main storage control units each having two processing units, and a further concrete example of two vector control units each having a vector processing unit and a scalar processing unit (ordinal computer) have been explained. It should be noted that the above-explanation also applies where more than two main storage control units and more than two vector control units are used. Also, a different number of processing units can be constructed in the same way by merely changing the number of ports.

We claim:

1. A multiprocessor control system comprising:
   at least one main storage unit;
   a plurality of main storage control units, respectively, operatively connected to said at least one main storage unit, each of said plurality of main storage control units including a priority order determination circuit;
   a plurality of processing units operatively connected to said main storage control units;
   a control but connected between said main storage control units, each one of said processing units transmitting a request for access to said at least one main storage unit, the requests from each one of said processing units being transmitted to one of said main storage control units simultaneously, and each one of said processing units transmitting an identical request to all of the other ones of said main storage control units through said control bus, said priority order determination circuits synchronously processing requests; and
   data, transmitted between each one of said processing units and an arbitrary one of said main storage units, being transmitted only through respective ones of said main storage control units connected to each of said processing units.

2. A multiprocessor control system according to claim 1, wherein at least one of said processing units comprises a vector processing unit, and said main storage control units comprise vector control units.

3. A multiprocessor control system according to claim 1, wherein said priority order determination circuit comprises:
   a plurality of bank conflict checkers for controlling use of said main storage unit and providing outputs;
   a bus conflict checker for controlling common bus use; and
   a main priority order control circuit controlling said main storage unit upon receipt of the outputs of said bank conflict checkers and said bus conflict checker.

4. A multiprocessor control system according to claim 1, wherein said request for access to said main storage unit comprises a valid bit designating a validity of the request, one of a plurality of address bits for said main storage unit to be accessed, one of a plurality of operation code bits designating a type of access operation, and a parity bit for said address bits and said operation code bits.

5. A multiprocessor control system comprising:
   main storage control units;
   processing units connected to respective ones of said main storage control units, and cross-coupled to adjacent ones of said main storage control units; and
   main storage units cross-coupled to said main storage control units, each of said main storage control units comprising:
     local request ports connected to said processing units for receiving requests from said processing units connected thereto;
     remote request ports connected to said processing units of adjacent ones of said main storage control units, for receiving requests from said processing units connected to said adjacent ones of said main storage control units;
     a priority order determination circuit, connected to said local request ports and said remote request ports, for determining access priority order to said main storage units;
     address registers connected between said priority order determination circuit and said main storage units; and
     a control bus connecting said processing units and said remote request ports in adjacent ones of said main storage control units.

6. A multiprocessor control system according to claim 5, wherein said priority order determination circuit means comprises:
   request queues, operatively connected to said local request ports and said remote request ports, for receiving request inputs from said local request ports and said remote request ports;
   bank conflict checkers, operatively connected to said request queues, for receiving request from said request queues for checking bank busy states;
   a bus conflict checker, operatively connected to said request queues, for receiving requests from said request queues, for checking bus conflict states; and
   a main priority order determination circuit connected to said bank conflict checkers, said bus conflict checker and said main storage units, for controlling access request to said main storage units in accordance with said bank conflict checkers and bus conflict checker.

7. A multiprocessor control system according to claim 6, wherein said request queues include first-in-first-out type register groups.

8. A multiprocessor control system comprising:
a plurality of processing units;
a plurality of main storage control units each having at least one of said processing units connected thereto;
at least one main storage unit connected to said main storage control units;
each of said main storage control units comprising a priority order determination circuit for determining a priority order and receiving an access request from a connected one of said processing units;
said priority order determination circuit determining an access priority upon receipt of an access request from said connected one of said processing units in one of said main storage control units and an access request from one of said processing units connected to another one of said main storage control units.

9. A multiprocessor control system according to claim 8, wherein said plurality of priority order determination circuits operate synchronously with each other.

10. A multiprocessor control system according to claim 8, wherein each of said main storage control units comprise:
local request ports connected to said processing units for receiving request from said processing units connected thereto;
remote request ports connected to said processing units of adjacent ones of said main storage control units, for receiving requests from said processing units connected to said adjacent ones of said main storage control units;
priority order determination circuit means, connected to said local request ports and said remote request ports, for determining access priority order to said main storage units;
address registers connected between said priority order determination circuit means and said main storage units; and
a control but connecting said processing units and said remote request ports in adjacent ones of said main storage control units.

11. A multiprocessor control system according to claim 10, wherein said priority order determination circuit means comprises:
request queues, operatively connected to said local request ports and said remote request ports, for receiving request inputs from said local request ports and said remote request ports;
bank conflict checkers, operatively connected to said request queues, for receiving requests from said request queues for checking bank busy states;
a bus conflict checker, operatively connected to said request queues, for receiving request from said request queues, for checking bus conflict states; and
a main priority order determination circuit connected to said bank conflict checkers, said bus conflict checker and said main storage units, for controlling access requests to said main storage units in accordance with said bank conflict checkers and bus conflict checker.

12. A multiprocessor control system according to claim 11, wherein said request queues include first-in-first-out type register groups.

13. A multiprocessor control system comprising:
a plurality of main storage units;
a first main storage control unit connected to said main storage units;
a second main storage control unit connected to said main storage units;
at least one processing unit, connected to said first main storage control unit, for requesting access to said first main storage control unit and for receiving an access result from said first main storage control unit;
at least one processing unit connected to said second main storage control unit, for requesting access to said second main storage control unit and for receiving an access result from said second main storage control unit;
a first priority order determination circuit, in said first main storage control unit and operatively connected to said second main storage control unit, for receiving an access request from said first main storage control unit, and for determining a priority order of an access upon receipt of the access request from said second main storage control unit; and
a second priority order determination circuit, in said second main storage control unit and operatively connected to said first main storage control unit, for receiving an access request from said second main storage control unit, and for determining a priority order of an access upon receipt of the access request from said first main storage control unit.

14. A multiprocessor control system according to claim 13, wherein said first priority order determination circuit and said second priority order determination circuit determine a priority order of the access request in synchronization with each other.

15. A multiprocessor control system according to claim 14, wherein at least one of said processing units comprises a vector processing unit, and said main storage control units comprise vector control units.

16. A multiprocessor control system according to claim 14, wherein said priority order determination circuit comprises:
a plurality of bank conflict checkers, operatively connected to said main storage units, for controlling use of a bank of one of said main storage units;
a bus conflict checker for controlling common bus use; and
a main priority order control circuit, operatively connected between said plurality of bank conflict checkers and said bus conflict checker, and said main storage units, controlling one of said main storage units upon receipt of the outputs of said bank conflict checkers and said bus conflict checker.

17. A multiprocessor control system according to claim 14, wherein said request for access to each of said main storage units comprises a valid bit designating a validity of the request, an address bit for said main storage unit to be accessed, an operation code bit designating a type of access operation, and a parity bit for said address bit and said operation code bit.

18. A multiprocessor control system according to claim 13, wherein at least one of said processing units comprises a vector processing unit, and said main storage control units comprise vector control units.

19. A multiprocessor control system according to claim 13, wherein said first and second priority order determination circuits each comprise:
- a plurality of bank conflict checkers, operatively connected to said main storage units, for controlling use of a bank of one of said main storage units;
- a bus conflict checker for controlling common bus use; and
- a main priority order control circuit, operatively connected between said plurality of bank conflict checkers and said bus conflict checker, and said main storage units, controlling one of said main storage units upon receipt of outputs from said bank conflict checkers and said bus conflict checker.

20. A multiprocessor control system according to claim 13, wherein said request for access to each of said main storage units comprises a valid bit designating a validity of the request, an address bit for said main storage unit to be accessed, an operation code bit designating a type of access operation, and a parity bit for said address bit and said operation code bit.

21. A multiprocessor control system comprising:
- a plurality of main storage units;
- a first main storage control unit connected to said main storage units;
- a second main storage control unit connected to said main storage units;
- at least one processing unit in a set of first processing units, connected to said first main storage control unit, for requesting access to said first main storage control unit, and for receiving an access result from said first main storage control unit;
- at least one processing unit in a set of second processing units, connected to said second main storage control unit, for requesting access to said second main storage control unit, and for receiving an access result from said second main storage control unit;
- a first priority order determination circuit, in said first main storage control unit and operatively connected to said second main storage control unit, for receiving an access request from said first main storage control unit, and for determining a priority order of access upon receipt of the access request from said second main storage control unit; and
- a second priority order determination circuit, in said second main storage control unit and operatively connected to said first main storage control unit, for receiving an access request from said second main storage control unit, and for determining a priority order of an access upon receipt of the access request from said first main storage control unit,
- said first priority order determination circuit and said second priority order determination circuit determine a priority order of the access request in synchronization with each other.

22. A multiprocessor control system according to claim 21, wherein at least one of said processing units comprises a vector processing unit, and said main storage control units comprise vector control units.

23. A multiprocessor control system according to claim 21, wherein said first and second priority order determination circuits each comprise:
- a plurality of bank conflict checkers, operatively connected to said main storage unit, for controlling use of a bank of each of said main storage units;
- a bus conflict checker for controlling common bus use; and
- a main priority order control circuit, operatively connected between said plurality of bank conflict checkers and said bus conflict checker, and said main storage units, controlling each of said main storage units upon receipt of outputs from said bank conflict checkers and said but conflict checker.

24. A multiprocessor control system according to claim 21, wherein said request for access to each of said main storage units comprises a valid bit designating a validity of the request, an address bit for said main storage unit to be accessed, an operation code bit designating a type of access operation, and a parity bit for said address bit and said operation code bit.

25. A multiprocessor control system comprising:
- a plurality of main storage units;
- a first main storage control unit connected to said main storage units;
- a second main storage control unit connected to said main storage units;
- at least one processing unit in a set of first processing units, connected to said first main storage control unit, for requesting access to said first main storage control unit, and for receiving an access result from said first main storage control unit;
- at least one processing unit in a set of second processing units, connected to said second main storage control unit, for requesting access to said second main storage control unit, and for receiving an access result from said second main storage control unit;
- a first priority order determination circuit provided in said first main storage control unit;
- a second priority order determination circuit provided in said second main storage control unit; and
- a control bus for supplying an access request from said first main storage control unit to said second priority order determination circuit and for supplying an access request from said second main storage control unit to said first priority order determination circuit;
- said first priority order determination circuit determining an access priority order from the access request from said first main storage control unit and from the access request obtained through said control bus, said second priority order determination circuit determining an access priority order from the access request from said second main storage control unit and from the access request obtained through said control bus, and said first and second priority order determination circuits operating synchronously with each other.

26. A multiprocessor control system according to claim 25, wherein at least one of said processing units comprises a vector processing unit, and said main storage control units comprise vector control units.

27. A multiprocessor control system according to claim 25, wherein said first and second priority order determination circuits each comprise:
- a plurality of bank conflict checkers, operatively connected to said main storage units, for controlling use of a bank fo each of said main storage units;

a bus conflict checker for controlling common bus use; and a main priority order control circuit, operatively connected between said plurality of bank conflict checkers and said bus conflict checker, and said main storage units, controlling each of said main storage units upon receipt of outputs from said bank conflict checkers and said bus conflict checker.

28. A multiprocessor control system according to claim 25, wherein said request for access to each of said main storage units comprises a valid bit designating a validity of the request, an address bit for said main storage 1 units to be accessed, an operation code bit designating a type of access operation, and a priority bit for said address bit and said operation code bit.

* * * * *

UNITED STATES PATENT AND TRADEMARK OFFICE
CERTIFICATE OF CORRECTION

PATENT NO. : 5,214,769
DATED : MAY 25, 1993
INVENTOR(S) : NOBUO UCHIDA ET AL.

It is certified that error appears in the above-indentified patent and that said Letters Patent is hereby corrected as shown below:

Col. 2, line 7, "bytes" should be --byte--.

Col. 4, line 59, "BO and B1" should be --$B_0$ and $B_1$--;
        line 60, " "0" " should be --"00"--;
        line 62, "bytes," should be --byte--.

Col. 7, line 53, "but" should be --bus--.

Col. 9, line 31, "request" should be --requests--;
        line 45, "but" should be --bus--;
        line 60, "request" should be --requests--.

Col. 12, line 11, "but" should be --bus--;
         lien 68, "fo" should be --of--.

Signed and Sealed this

First Day of March, 1994

Attest:

BRUCE LEHMAN

*Attesting Officer*   *Commissioner of Patents and Trademarks*